United States Patent [19]

Suris

[11] Patent Number: 4,658,100

[45] Date of Patent: Apr. 14, 1987

[54] TROLLEY WIRE HANGER

[75] Inventor: Vladimir Suris, Lexington, Ohio

[73] Assignee: Harvey Hubbell Incorporated, Orange, Conn.

[21] Appl. No.: 824,242

[22] Filed: Jan. 30, 1986

[51] Int. Cl.⁴ .............................................. B60M 1/23
[52] U.S. Cl. ........................................ 191/41; 24/542
[58] Field of Search ...................... 191/40, 41; 24/535, 24/536, 538, 542, 544; 248/51, 74.1, 74.2, 74.4, 74.5

[56] References Cited

U.S. PATENT DOCUMENTS

| | | | |
|---|---|---|---|
| 1,161,081 | 11/1915 | Starkey et al. | 191/41 |
| 1,728,820 | 9/1929 | Bower | 191/41 X |
| 1,886,463 | 11/1932 | Birch | 191/41 |
| 3,177,542 | 4/1965 | James | 24/535 X |

FOREIGN PATENT DOCUMENTS

| | | | |
|---|---|---|---|
| 2527996 | 12/1983 | France | 191/41 |
| 383437 | 11/1932 | United Kingdom | 24/536 |

Primary Examiner—Robert B. Reeves
Assistant Examiner—David F. Hubbuch
Attorney, Agent, or Firm—Jerry M. Presson; Walter C. Farley

[57] ABSTRACT

A trolley wire suspension hanger includes a rod bent to form two loops at opposite ends with a substantially straight portion in between, one loop being to go over the messenger wire and the other for holding a clip. The clip includes a V-shaped member bent from sheet bronze with a C-shaped latch member passing through a T-shaped opening in each leg of the clip. The ends of the clip are bent inwardly toward each other to engage grooves in the trolley wire, whereupon the latch member is rotated to clamp the ends of the clip member in place.

5 Claims, 9 Drawing Figures

TROLLEY WIRE HANGER

This invention relates to an improved trolley wire hanger.

BACKGROUND OF THE INVENTION

When an electrically powered vehicle is designed to receive its power from an external source through an overhead trolley wire instead of a third-rail, the power wire must be suspended in such a way that the underneath surface of the wire is not obstructed. This is necessary because the vehicle has an upwardly and rearwardly extending pole to make contact with the trolley wire, the pole having a harp and contact shoe assembly or the like at its upper end which rides along against the wire. If there are obstructions along the wire, the shoe is likely to be damaged or to jump off of the wire, opening the circuit and necessitating manual replacement of the shoe against the wire.

In one arrangement, a messenger wire is suspended between supports and follows a catenary curve. The trolley wire is then suspended below the messenger wire by a plurality of hangers which somehow engage both the messenger wire and the trolley wire. In known hangers for this purpose, the upper end of the hanger loops over the messenger wire and is provided with a releasable clip at its lower end. The trolley wire is grooved so that it can be engaged by the clip above a horizontal catenary surface passing through its central axis, thereby leaving the lower portion unobstructed as desired.

While these hangers are usable, they have some serious disadvantages. It is important for the hangers to be easily removable and replaceable for maintenance but, once attached, the hangers must not release by themselves. Hangers of the prior art are subject to loosening and release because of the vibration to which the trolley wire is subject and are therefore not sufficiently reliable. One such clip uses a threaded fastener to hold cast clip halves together but the threaded fastener rather easily vibrates apart, releasing the trolley wire. That same hanger also has the disadvantages of significant weight because of the cast clip, a plurality of parts, considerable difficulty of manufacture, and the need for a special tool to lock the clip.

Another prior art clip uses a rotatable locking device which passes through an irregular opening in the clip and is then rotated to lock the clip in its trolley wire-engaging position. However, the rotatable device is also subject to being loosened and turned by vibration and, in an apparent effort to make the structure more secure, the clip itself is made of a very heavy gauge material, adding unnecessary and undesirable weight. This also requires larger force on installation which, in turn, creates larger permanent deformation of the camming surfaces, thereby limiting the number of possible re-installations of the clip and shortening its useful life. The clip opening which receives the locking device is also a complex shape, increasing the cost of the tool which is used to form the clip and also increasing the tool maintenance costs, and the clip further requires additional openings for attachment to the rest of the hanger.

SUMMARY OF THE INVENTION

Accordingly, an object of the present invention is to provide a hanger assembly for trolley wire which is easy to install and remove but which, when installed, is secure and reliable.

A further object is to provide such a hanger assembly which is relatively simple and inexpensive to manufacture and assemble and which uses a minimum number of components and a minimum amount of material.

Briefly described, the invention comprises a hanger for suspending a grooved trolley wire below a messenger wire comprising a stiff, resilient elongated rod bent to form a first U-shaped loop at one end for partially encompassing the messenger wire and a second U-shaped loop at the other end, said loops lying in substantially the same plane. A clip member for engaging the grooves in the trolley wire comprises a flat sheet of metal bent to form a U-shaped body having two diverging legs, the distal end of each of the legs being bent inwardly at an obtuse angle relative to the remainder of the leg so that the ends of the legs lie in planes forming an acute angle with each other and so that the ends are spaced apart to engage the grooves. Each of the legs has means defining a generally T-shaped opening therethrough with the stem of each said T-shaped opening pointing away from the distal ends of the leg in which it is formed, the stem being dimensioned to receive the second loop of the hanger. The cross-piece of each T-shaped opening is parallel with the distal end of the leg in which it is formed and is adjacent the obtuse angle bend in the leg. A latch member comprises a transverse bar and two perpendicular end bars fixedly formed at opposite ends of the transverse bar, the end bars having inwardly facing substantially parallel surfaces. The lengths of the end bars and the thickness of the latch member is such that the latch member can be inserted through the cross-pieces of the T-shaped openings with small clearance until the inwardly facing surfaces of the end bars lie outside of the clip member, whereupon the latch member is rotatable through an angle of about 90° from its inserted orientation so that the inwardly facing surfaces of the end bars contact the outwardly facing surfaces of the obtuse angle bends and press the outwardly facing surfaces toward each other, thereby pressing the distal ends of the legs toward each other in the trolley wire grooves to firmly clamp the trolley wire.

BRIEF DESCRIPTION OF THE DRAWINGS

In order to impart full understanding of the manner in which these and other objectives are attained in accordance with the invention, a particularly advantageous embodiment thereof will be described with reference to the accompaying drawings, which form a part of this specification, and wherein.

DESCRIPTION OF THE PREFERRED EMBODIMENT

Figure 1:
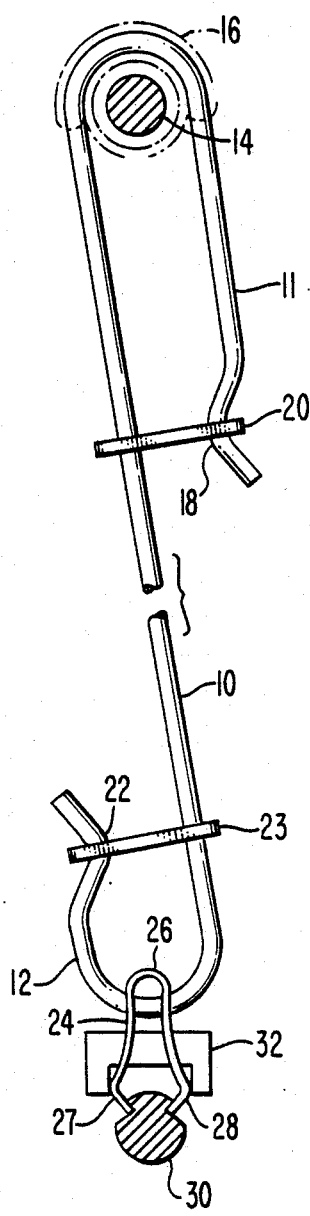
FIG. 1 is a side elevation of a trolley wire hanger in accordance with the invention coupled between a messenger wire and a trolley wire.
Figure 2:
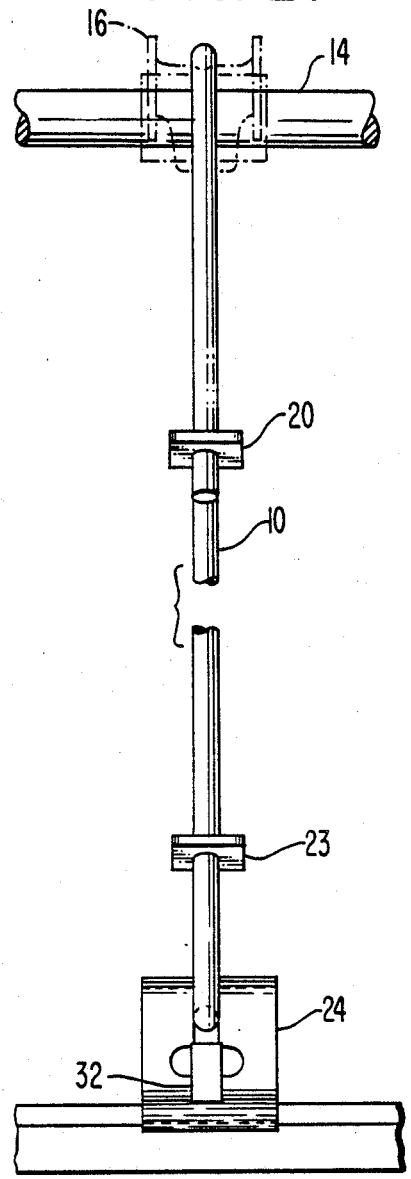
FIG. 2 is a front elevation of the structure of FIG. 1.

Referring first to FIGS. 1 and 2, a hanger assembly in accordance with the invention includes a hanger rod 10 having an upper generally U-shaped loop 11 and a lower generally U-shaped loop 12. Rod 10 is made of stainless steel rod of about 3/16" diameter, this material being relatively stiff but having sufficient resilience so that it can be elastically bent, to some degree, by hand. Upper loop 11 is formed with a span of slightly more than 1" so that it can loosely encompass a messenger wire 14. A commonly used messenger wire is approximately 0.729" in diameter. A slide member 16 is preferably employed around the wire and within loop 11, member 16 being conventional in nature. It will be observed that loop 11 is relatively long and that it is provided with an inwardly pointing bend 18 near its open end to receive a retainer 20, the length of the loop being provided so that bend 18 can be flexed toward the other side of the loop by hand to permit retainer 20 to be easily put on or off, thereby opening or closing the loop.

Loop 12, on the other hand, is somewhat shorter. Loop 12 is also provided with an inwardly pointing bend 22 to permit the engagement of a retainer 23 thereon, but the length of the free arm of loop 12 is somewhat shorter because it need not be opened and closed so easily. Generally speaking, the end of the assembly including loop 12 is initially assembled and is not disassembled unless replacement of components is required, while loop 11 is opened and closed during installation and during replacement of the entire hanger assembly, if necessary.

A clip member 24 is provided at the lower end of the hanger assembly and comprises a generally U-shaped structure having relatively wide legs, as seen in FIG. 2, which diverge from the central bend 26. Near their distal ends, the legs are provided with obtuse angle bends 27 and 28 so that the distal end portions point inwardly toward each other. In the preferred form illustrated, the distal end portions lie in planes which intersect each other at an acute angle, near 90°, and are spaced so that they can engage the grooves in a trolley wire 30.

Wire 30 is conventional in nature and is normally a solid rod-like member having an outer diameter of approximately ⅜". It is, essentially, an elongated copper rod with grooves on opposite sides above the central plane thereof. In its suspended state, the axis follows a catenary line and a transverse line through the center thus follows a substantially horizontal catenary surface. The grooves lie above this surface so that the lower portion of the wire is unobstructed and follows a smooth, gradual curve.

A latch member 32 extends through openings formed in clip 24 and is provided with legs engaging the outer surfaces of bends 27 and 28 to hold the clip in position.

Figure 3:
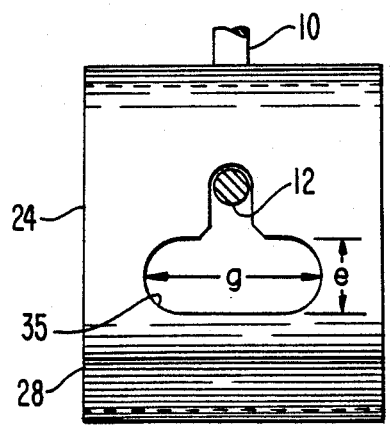
FIG. 3 is a front elevation of a clip usable in the structure of FIGS. 1 and 2 apart from the remainder of the assembly.
Figure 4:
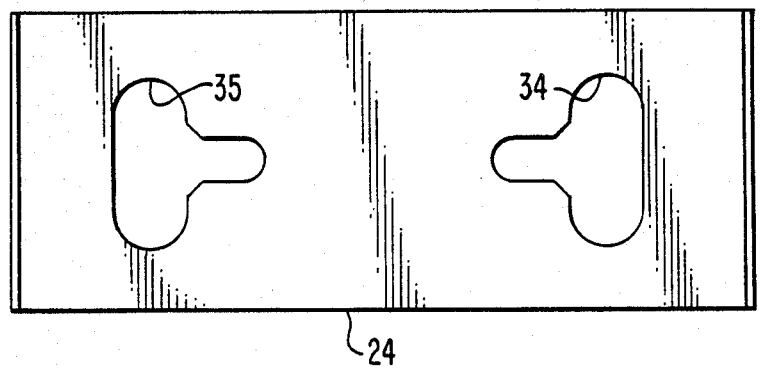
FIG. 4 is a plan view of an unbent clip with openings formed therein.

As seen in FIGS. 3 and 4, the clip itself is formed from a sheet of 14-gauge bronze approximately 1.25" wide and 3.125" long. This bronze strip is then provided with two T-shaped openings 34 and 35 arranged as shown in FIG. 4 so that the stems of the T's point toward each other and the cross-pieces thereof are substantially parallel with the distal ends. The stems of the openings are dimensioned to receive rod 10 with small clearance so that the clip, when bent, can slide along loop 12. The cross-pieces of each T-shaped opening are somewhat wider. Chamfered corners 33 between the stem and cross-piece of each T provide for rotation and retention of the latch member as will be described.

This bronze strip with the openings formed therein is then bent so that the legs diverge outwardly, initially, at an angle of about 5° from the central plane, the divergence increasing as bends 27 and 28 are reached. In its relaxed state, the distal ends of the clip are separated by a distance of about 5/16", a sufficient distance to encompass the grooves in wire 30. As will be recognized by those skilled in metal working and forming arts, it is a relatively simple matter to form obtuse bends 27 and 28 and to then bend the bronze strip into the V-shape shown in FIG. 1. In that configuration, T-shaped openings 34 and 35 are substantially aligned so that loop 12 can pass through the stems thereof as shown in FIG. 3.

Figure 5:
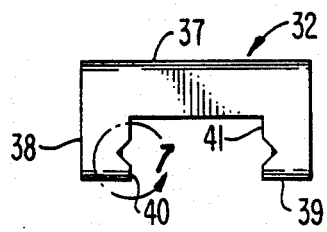
FIG. 5 is a side elevation of a latch member usable in the assembly of FIGS. 1 and 2.
Figure 6:
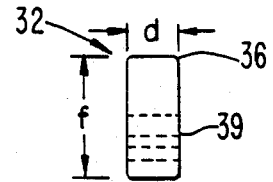
FIG. 6 is an end elevation of the latch member of FIG. 5.
Figure 9:
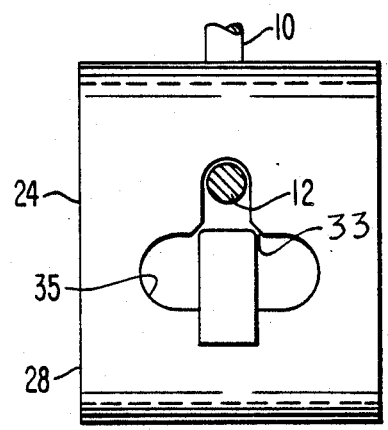
FIG. 9 is a view similar to FIG. 3 showing the latch member in latching position.
Figure 7:
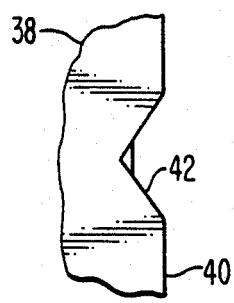
FIG. 7 is an enlarged partial side elevation of an end bar of the latch member of FIG. 5.

Latch member 32 is shown in more detail in FIGS. 5-7 and includes a transverse bar 37 rigidly connected to and integrally formed with end bars 38 and 39 which are parallel with each other and perpendicular to bar 37. The upper corners 36 of bar 37 are rounded. Bars 38 and 39 have inwardly facing surfaces 40 and 41. Of particular importance is the provision of a notch 42 in each of those inwardly facing surfaces, the notch being enlarged in FIG. 7. It will also be observed that the thickness of latch member 32, i.e., the dimension d visible in FIG. 6, is only slightly smaller than the dimension e of the cross-piece of each T-shaped opening. Furthermore, the height f of the latch member is only slightly smaller than the length g of the opening cross-piece. Typically, dimension d is 0.25", dimension e is 0.3125", dimension f is 0.625", and dimension g is 0.719". Thus, when properly oriented, the latch member can be inserted through openings 34 and 35 in the bent clip member.

After insertion, with the clip member engaging the grooves in wire 30, the latch member end bars can be rotated through an angle of 90° until the end bars reach the position shown in FIG. 1 whereupon the rounded corners 36 of the latch member engage the chamfers 33 of the T-shaped openings of the clip and grooves 42 engage the outwardly facing surfaces of bends 27 and 28, retaining the latch member in position on the clip member and pressing the legs inwardly against the grooves in wire 30. When thus assembled, the latch and clip are securely fastened to wire 30 but can easily be removed therefrom by rotation of the latch member until the legs are free of the obtuse angle bends.

Figure 8:
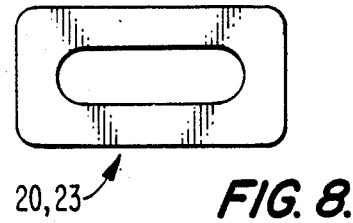
FIG. 8 is a plan view of a retainer member usable in the assembly of FIGS. 1 and 2.

FIG. 8 shows a retainer member 20 or 23, these members being identical. As will be seen, the member is simply a rectangular body of plate-like material having an elongated opening dimensioned to span the open ends of the loops with the legs of the loops under slight tension so that the loops are securely closed.

While one advantageous embodiment has been chosen to illustrate the invention, it will be understood by those skilled in the art that various changes and modifications can be made therein without departing from the scope of the invention as defined in the appended claims.

What is claimed is:

1. A hanger for suspending a grooved trolley wire below a messenger wire comprising the combination of
a stiff, resilient wire bent to form a first U-shaped loop at one end for partially encompassing the messenger wire and a second U-shaped loop at the other end, said loops lying in substantially the same plane;

a clip member for engaging the grooves in said trolley wire, said clip member comprising a flat sheet of metal bent to form a U-shaped body having two diverging legs, the distal end of each of said legs being bent inwardly at an obtuse angle relative to the remainder of the leg so that said ends lie in planes forming an acute angle with each other and said ends are spaced apart to engage said grooves, each of said legs having means defining a generally T-shaped opening therethrough with the stem of each said T-shaped opening pointing away from said distal end of said leg and being dimensioned to receive said second loop, and with the cross-pieces of each said T-shaped opening being parallel with said distal end and adjacent the obtuse angle bend in said leg; and a latch member comprising a transverse bar and two perpendicular end bars at opposite ends of said transverse bar, said end bars having inwardly facing substantially parallel surfaces, the lengths of said end bars and the thickness of said latch member being such that said latch member can be inserted through said cross-pieces of said T-shaped opening with small clearance until said inwardly facing surfaces of said end bars lie outside of said clip member, said latch member being rotatable through an angle of about 90° from its inserted orientation so that said inwardly facing surfaces of said end bars contact outwardly facing surfaces of said obtuse angle bends and press said outwardly facing surfaces toward each other, thereby pressing said distal ends toward each other in said trolley wire grooves to firmly clamp said trolley wire.

2. A hanger according to claim 1 wherein each of said inwardly facing surfaces of said end bars includes means defining an obtuse V-shaped notch to engage the outer surfaces of said obtuse angle bends.

3. A hanger according to claim 2 and further comprising first and second retainer members each having an elongated opening therein for spanning the open end of one of said loops, one side of the open end thereof having an upward bend to hold said retaining member in place.

4. A hanger according to claim 2 wherein the stem of said T-shaped opening is narrower than the thickness of said latch member.

5. A hanger according to claim 1 wherein the outer corners of said T-shaped openings at the intersections of said stems and cross-pieces are chamfered and the corners of said transverse bar are rounded to facilitate retention of said latch member in said clip member.

* * * * *